(12) United States Patent
Reiners et al.

(10) Patent No.: US 11,832,555 B2
(45) Date of Patent: Dec. 5, 2023

(54) CLOSED LOOP BILLET LENGTH CONTROL SYSTEM FOR A HARVESTER

(71) Applicant: DEERE & COMPANY, Moline, IL (US)

(72) Inventors: Alexander C. Reiners, Thibodaux, LA (US); John A. Dighton, Thibodaux, LA (US); Ana E. Carbunaru, Houma, LA (US)

(73) Assignee: DEERE & COMPANY, Moline, IL (US)

( * ) Notice: Subject to any disclaimer, the term of this patent is extended or adjusted under 35 U.S.C. 154(b) by 408 days.

(21) Appl. No.: 17/107,267

(22) Filed: Nov. 30, 2020

(65) Prior Publication Data

US 2022/0167557 A1 Jun. 2, 2022

(51) Int. Cl.
*A01D 43/08* (2006.01)
*A01D 45/10* (2006.01)
*A01D 34/00* (2006.01)

(52) U.S. Cl.
CPC ......... *A01D 43/085* (2013.01); *A01D 34/008* (2013.01); *A01D 43/086* (2013.01); *A01D 45/10* (2013.01)

(58) Field of Classification Search
CPC .... A01D 45/10; A01D 43/085; A01D 43/086; A01D 34/008; A01D 34/006; A01D 43/077; A01D 41/1271
See application file for complete search history.

(56) References Cited

U.S. PATENT DOCUMENTS

| | | | |
|---|---|---|---|
| 4,386,492 A | | 6/1983 | Tilby |
| 4,483,129 A | * | 11/1984 | Lester ............ A01D 45/10 56/11.9 |
| 4,555,896 A | * | 12/1985 | Stiff ............ A01D 45/10 56/16.5 |
| 6,062,009 A | | 5/2000 | Caillouet |
| 6,508,049 B1 | * | 1/2003 | Cox ............ A01D 45/10 56/10.2 R |
| 7,618,311 B2 | * | 11/2009 | Diekhans ............ A01D 43/085 460/7 |
| 10,255,670 B1 | * | 4/2019 | Wu ............ H04N 7/183 |
| 2006/0191251 A1 | * | 8/2006 | Pirro ............ A01F 29/09 56/60 |
| 2007/0010305 A1 | * | 1/2007 | Vogelgesang ......... A01F 29/14 460/112 |
| 2008/0186487 A1 | * | 8/2008 | Kormann ......... A01D 41/1277 356/328 |

(Continued)

FOREIGN PATENT DOCUMENTS

JP H02255009 A 10/1990

*Primary Examiner* — Thomas B Will
*Assistant Examiner* — Julia C Tran
(74) *Attorney, Agent, or Firm* — Michael Best & Friedrich LLP (57) ABSTRACT

A harvester includes a feed system operable at a feed speed and configured to feed a crop towards a blade. The blade is configured to cut the crop into crop billet and is operable at a cutting speed. The harvester further includes an optical sensor configured to generate a signal corresponding to a length of the crop billet and a control system with a processor, a memory, and a human-machine interface. The control system is configured to receive the signal and programmed to adjust one or both of the cutting speed or the feed speed based on the signal.

20 Claims, 8 Drawing Sheets

(56) References Cited

U.S. PATENT DOCUMENTS

| | | | |
|---|---|---|---|
| 2010/0269470 A1* | 10/2010 | Price | A01D 45/10 |
| | | | 56/10.2 H |
| 2015/0262351 A1* | 9/2015 | Dima | G06T 7/90 |
| | | | 382/110 |
| 2015/0342118 A1 | 12/2015 | Corbett et al. | |
| 2016/0198628 A1* | 7/2016 | Byttebier | A01F 29/10 |
| | | | 56/10.2 B |
| 2017/0049051 A1* | 2/2017 | Cleodolphi | A01D 41/1274 |
| 2017/0055445 A1* | 3/2017 | Mahieu | A01F 12/40 |
| 2017/0112059 A1* | 4/2017 | Craig | A01D 45/10 |
| 2018/0125005 A1 | 5/2018 | Lawn | |
| 2019/0037770 A1* | 2/2019 | Dugas | A01F 12/444 |
| 2019/0230856 A1* | 8/2019 | Dighton | A01D 41/1217 |
| 2019/0261559 A1* | 8/2019 | Heitmann | A01D 41/127 |

\* cited by examiner

CLOSED LOOP BILLET LENGTH CONTROL SYSTEM FOR A HARVESTER

BACKGROUND

The present disclosure relates to a harvester having a feed system, a chopper, and a cleaning system for processing a crop, such as sugar cane.

SUMMARY

In one aspect, the disclosure provides a harvester including a feed system operable at a feed speed and configured to feed a crop towards a blade. The blade is configured to cut the crop into crop billet and is operable at a cutting speed. The harvester further includes an optical sensor configured to generate a signal corresponding to a length of the crop billet and a control system with a processor, a memory, and a human-machine interface. The control system is configured to receive the signal and programmed to adjust one or both of the cutting speed or the feed speed based on the signal.

In another aspect, the disclosure provides a harvester including a feed system operable at a feed speed and configured to feed a crop towards a blade. The blade is configured to cut the crop into crop billet and is operable at a cutting speed. The harvester further includes an optical sensor configured to generate a signal corresponding to a length of the crop billet and a control system with a processor, a memory, and a human-machine interface. The control system is configured to 1) receive an input from an operator by way of the human-machine interface, the input including a target billet parameter, 2) receive the signal from the optical sensor corresponding to the length of the crop billet, and 3) adjust one or both of the cutting speed or the feed speed such that a subsequent billet parameter approaches the target billet parameter.

In yet another aspect, the disclosure provides a harvester including an inlet configured to receive a crop, a blade configured to cut the crop into crop billet and extraneous plant matter, a cleaning system configured to separate at least some of the extraneous plant matter from the crop billet, the cleaning system having a cleaning speed, an optical sensor configured to generate a signal corresponding to a length of the crop billet, and a control system including a processor, a memory, and a human-machine interface. The control system is configured to receive the signal from the optical sensor and programmed to adjust the cleaning speed based on the signal.

Other aspects of the disclosure will become apparent by consideration of the detailed description and accompanying drawings.

DETAILED DESCRIPTION

Before any implementations of the disclosure are explained in detail, it is to be understood that the disclosure is not limited in its application to the details of construction and the arrangement of components set forth in the following description or illustrated in the accompanying drawings. The disclosure is capable of supporting other implementations and of being practiced or of being carried out in various ways.

Figure 1:
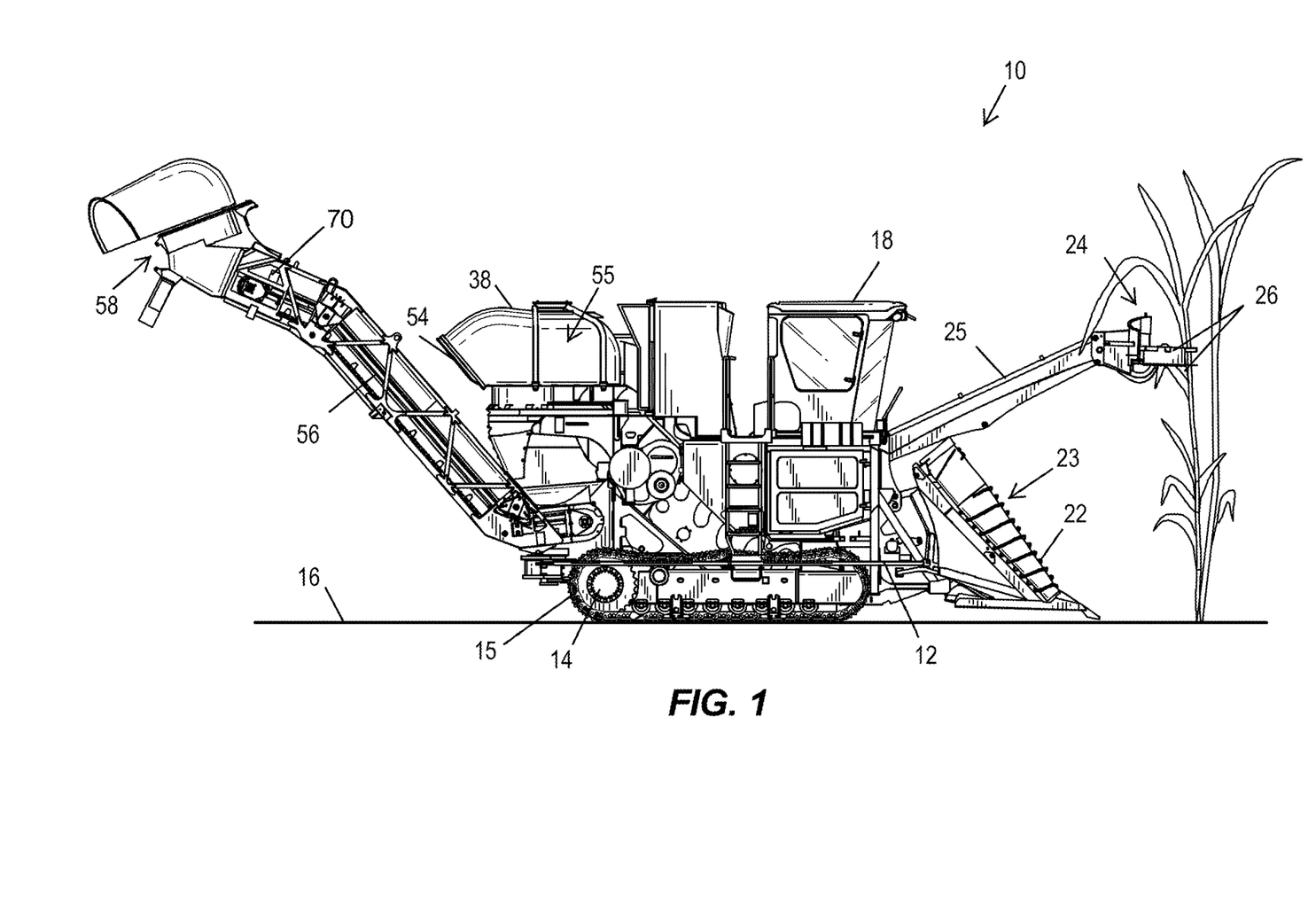
FIG. 1 is a side view of a harvester, such as a sugar cane harvester, in accordance with one implementation of the present disclosure.

FIG. 1 illustrates a harvester 10, such as a sugarcane harvester, including a prime mover (not shown), such as an internal combustion engine, for providing motive power and a throttle 11 (FIG. 3) for controlling a speed of the prime mover and thus a ground speed of the harvester 10. The harvester 10 includes a main frame 12 supported on wheels 14 having continuous tracks 15, tires, or other traction devices that engage a support surface 16 (e.g., the ground or field). The tracks 15 interact directly with the support surface 16 and are responsible for harvester 10 movement and tractive effort, although in other implementations the harvester 10 is provided only with wheels (rather than tracks as illustrated). An operator's cab 18 is mounted on the frame 12 and contains a seat 20 (FIG. 3) for an operator. A pair of crop lifters 22 having side by side augers or scrolls is mounted to the front of the frame 12, which operate on opposite sides of a row of crop to be harvested. The pair of crop lifters 22 generally define an inlet 23 for receiving the crop. The crop lifters 22 cooperate with a base cutter (not shown) including counter-rotating discs which cut off the stalks of crop close to the support surface 16. A topper 24 extends from the frame 12 on a boom 25. The topper 24 has a topper blade or blades 26 for cutting the tops off crop. In other implementations, the harvester 10 may be configured for other crops, such as corn and other plants.

Figure 2:
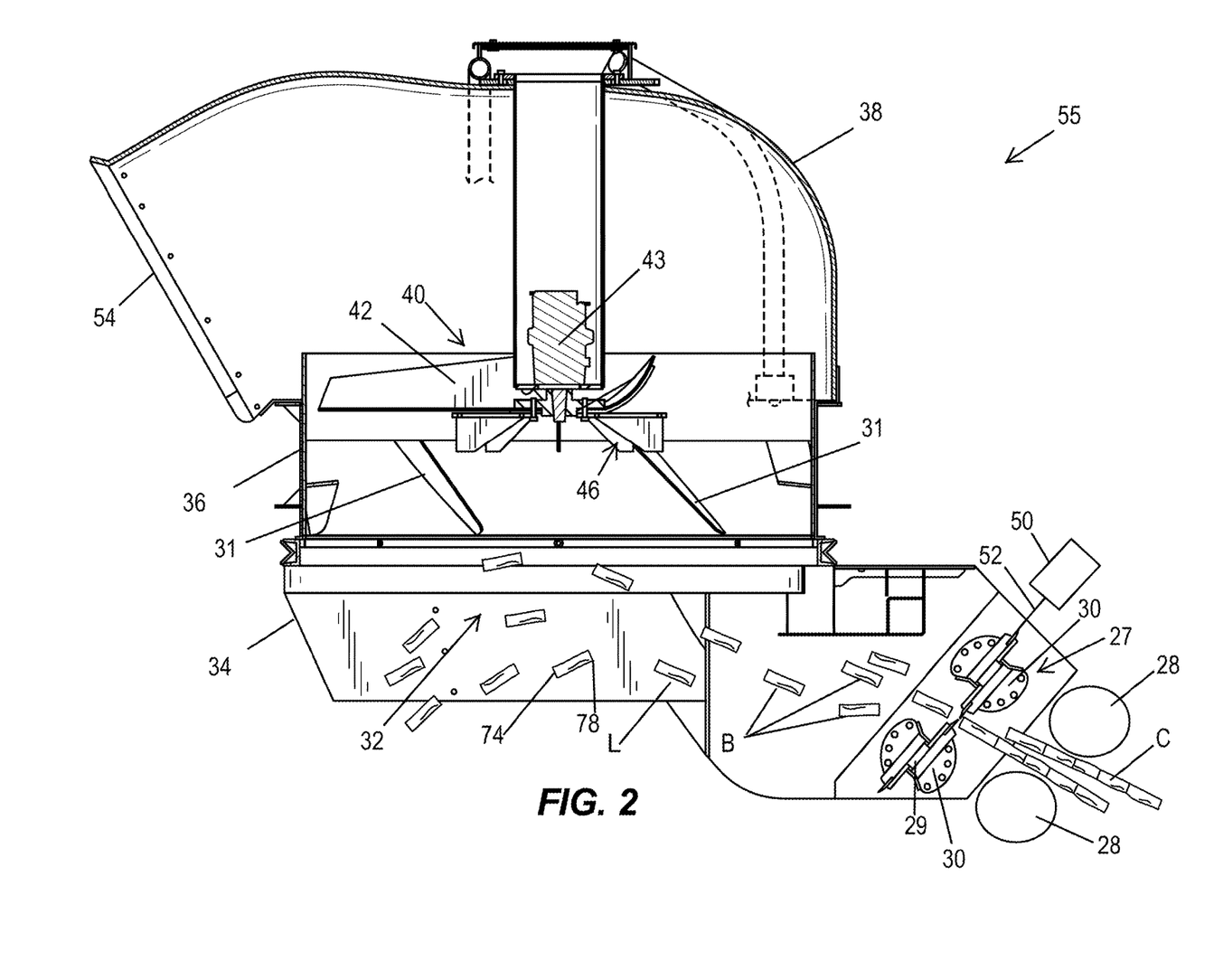
FIG. 2 is an enlarged cross-sectional view of a portion of the harvester of FIG. 1.

FIG. 2 illustrates a cross section through a chopper 27 and a cleaning system 55. The crop may be fed to the chopper 27 by a set of feed rollers 28 (also referred to herein as a feed system 28) at a feed speed. In other implementations, the feed system 28 may include other types of feed mechanisms, such as conveyors, etc.

The chopper 27 cuts the crop into extraneous plant matter and crop billet B, which includes pieces of the stalk of the crop. A motor 50 drives the chopper 27, such as a hydraulic motor, a pneumatic motor, an electric motor, an engine, or other suitable prime mover. The motor 50 includes a drive shaft 52 operatively coupled to drive the chopper 27. For example, the drive shaft 52 may be keyed or operatively coupled in other suitable ways to drive the chopper 27. The motor 50 may be configured to drive the chopper 27 at a variety of speeds, which may be referred to herein as a cutting speed. The motor 50 and the chopper 27 may be referred to herein as the chopper system. The chopper 27 includes a set of chopper drums 29 driven by the motor 50. The chopper drums 29 include a blade 30 for cutting the stalks of crop, such as cane C, into crop billet B, which includes pieces of the stalk. Each billet B may have a length L, measured from end to end. In the illustrated implementation, the chopper drums 29 may include counter-rotating drum cutters with overlapping blades. In other implementations, the chopper 27 may include any suitable blade or blades for cutting the stalks of crop, and other types of prime movers for driving the chopper 27. The crop also includes dirt, leaves, roots, and other plant matter, which is collectively referred to herein as extraneous plant matter, which is also cut in the chopper 27 along with the cane C.

The chopper 27 directs a stream of the cut crop (crop billet B and extraneous plant matter) to the cleaning system 55. In some implementations, the cut crop may be transported to the cleaning system 55 by an elevator or conveyor.

The cleaning system 55 is coupled to the frame 12 and disposed downstream of the chopper 27 for receiving cut crop from the chopper 27. The cleaning system 55 receives the cut crop from the chopper 27 and generally separates the cut crop, e.g., by way of a crop cleaner 40 and/or other components. The crop cleaner 40 may include any suitable mechanism for cleaning the cut crop, such as a fan 42 which may be driven by a motor 43 (as in the illustrated implementation), or a source of compressed air, a rake, a shaker, or any other mechanism that discriminates various types of crop parts by weight, size, shape, etc. in order to separate extraneous plant matter from crop billet. The cleaning system 55 may include any combination of one or more of a cleaning chamber 32, a cleaning chamber housing 34, the crop cleaner 40, a fan enclosure 36, a hood 38 having an opening 54, and a centrifugal blower wheel 46. The crop cleaner 40 may operate at a cleaning speed, such as a speed of the fan 42. In other implementations, the cleaning speed may be the speed of the centrifugal blower wheel 46, or a speed of any combination of any of the components of the cleaning system 55 described above. The cleaning chamber 32 is a space generally defined by the cleaning chamber housing 34, the fan enclosure 36, and/or the hood 38, all of which are coupled to the frame 12 and located just downstream of the chopper 27 for receiving cut crop from the chopper 27. The fan enclosure 36 is coupled to the cleaning chamber housing 34 and may include deflector vanes 31.

The hood 38 is coupled to the fan enclosure 36 and has a domed shape, or other suitable shape, and includes an opening 54 angled out from the harvester 10 and facing slightly down onto the field 16. In some implementations, the opening 54 may be generally perpendicular to the drive shaft 52. The hood 38 directs cut crop through the opening 54 to the outside of the harvester 10, e.g., for discharging a portion of cut crop removed from the stream of cut crop back onto the field.

Referring again to FIG. 1, a conveyor 56 is coupled to the frame 12 for receiving cleaned crop from the cleaning system 55. The conveyor 56 terminates at a discharge opening 58 (or outlet) elevated to a height suitable for discharging cleaned crop into a collection receptacle of a vehicle (not shown), such as a truck, wagon, or the like following alongside the harvester 10. A secondary cleaner 60 may be disposed adjacent the discharge opening 58 for cleaning the crop a second time before being discharged to the vehicle. For example, the secondary cleaner 60 may include a fan, compressed air, a rake, a shaker, or other suitable device for cleaning the crop.

The billets B are generally separated from the extraneous plant matter in the cleaning chamber 32 as the crop cleaner 40 draws the generally lighter extraneous plant matter into the hood 38 and out the opening 54. All the cut crop directed through the opening 54, which is ejected back onto the field 16, is referred to herein as residue. Residue typically includes primarily the extraneous plant matter (which has generally been cut) and may include some crop billet B, though the amount of crop billet B if any should be low.

The cleaning chamber housing 34 directs the cleaned crop to the conveyor 56. The cleaned crop typically includes primarily crop billet B, although some extraneous plant matter may still be present in the cleaned crop. Thus, some extraneous plant matter may be discharged with the crop billet B from the discharge opening 58. Extraneous plant matter discharged from the discharge opening 58 to the vehicle is referred to herein as trash.

Figure 3:
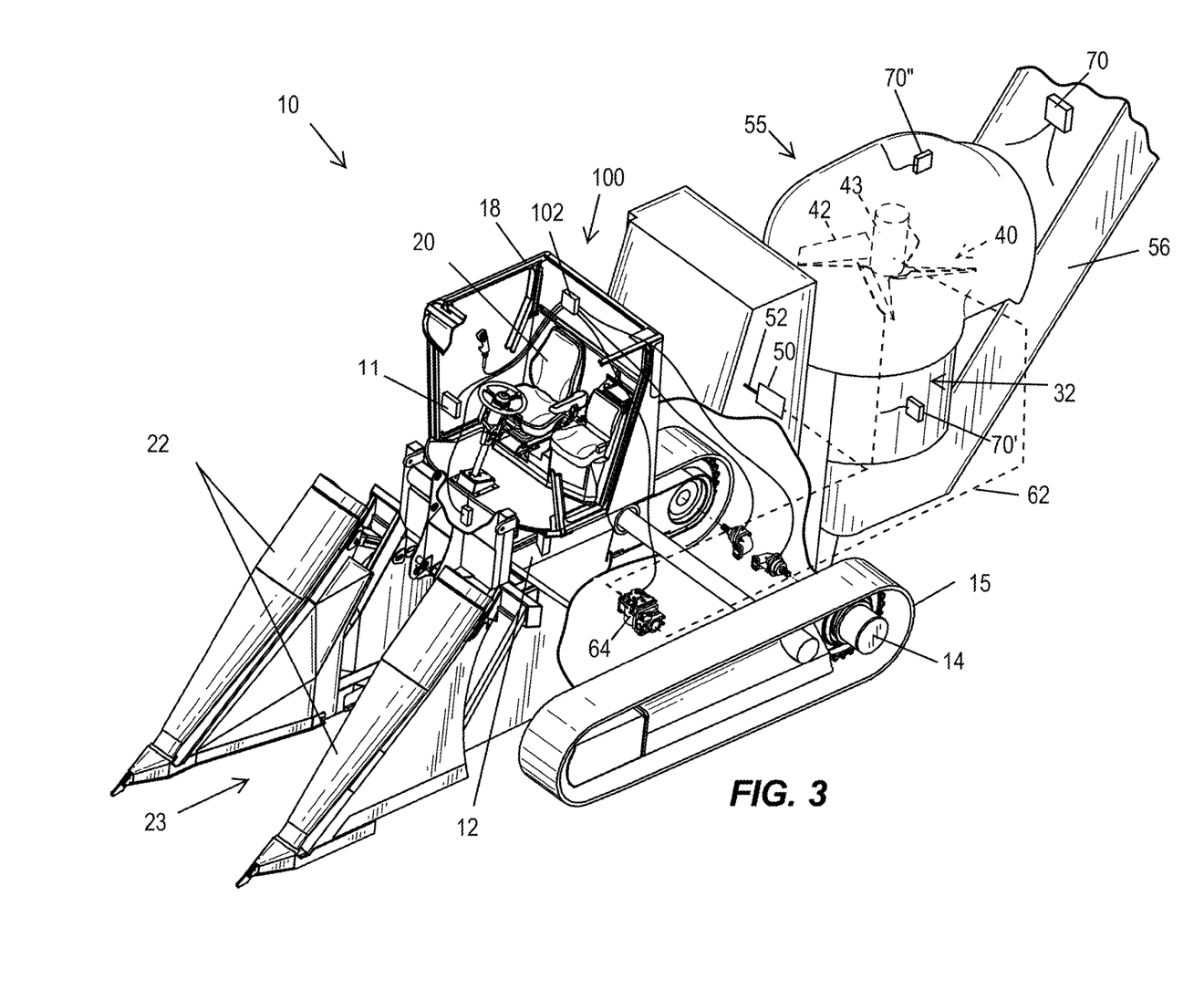
FIG. 3 is a perspective view of another portion of the harvester of FIG. 1.

Illustrated schematically in FIG. 3, a hydraulic circuit 62 for powering the motor 43 and the motor 50 is operatively coupled thereto. In other implementations, the circuit 62 may be electric, pneumatic, may comprise mechanical linkages, etc. A detailed description of one example of a hydraulic circuit for a harvester fan can be found in U.S. Patent Publication No. 2015/0342118, jointly owned with the present application, the entire contents of which are incorporated herein by reference. For example, the hydraulic circuit 62 is a closed-loop hydraulic circuit, which is powered by a pump 64. The pump 64 may be driven by the prime mover (not shown) of the harvester 10 or other power source.

The harvester 10 includes a sensor 70 configured to detect an optical image of the crop billet B passing through the harvester 10. The sensor 70 may be configured to detect a two-dimensional or a three-dimensional appearance of crop billet B. The sensor 70 may be an optical sensor and may be configured to detect any wavelength or frequency in the spectrum. For example, the sensor 70 may include a three-dimensional vision camera, a light detection and ranging (LIDAR) device, a structured light three-dimensional scanner, and/or stereo cameras. In other implementations, the sensor 70 may include a two-dimensional vision sensor, such as a camera configured to detect any wavelength or frequency in the spectrum and generate a signal associated with at least a two-dimensional appearance of the length L of the billet B and/or other dimensions of the billet B. The sensor 70 may detect every billet B or just some of the crop billet B.

The sensor 70 may be disposed downstream of the chopper 27 in any suitable location for observing the crop billet B. More specifically, the sensor 70 may be disposed adjacent the conveyor 56 (e.g., overhead of the conveyor 56) to observe the billets B being conveyed thereon, as illustrated in FIG. 3. The sensor 70 may additionally or alternatively be disposed anywhere else in the harvester 10 at or downstream of the chopper 27. For example, the sensor 70 may be disposed between the blade 30 and the cleaning system 55 or in the cleaning chamber 32, as also illustrated in FIG. 3 using reference numerals 70' and 70" respectively. The sensor 70 may also be disposed outside of the harvester 10, such as to observe the billets B collected in the collection vehicle (not shown) or even at a mill or other destination. In some implementations, the harvester 10 includes just one of the sensors 70, 70', 70". In some implementations, multiple of the sensors 70, 70', and 70" are used.

Figure 5:
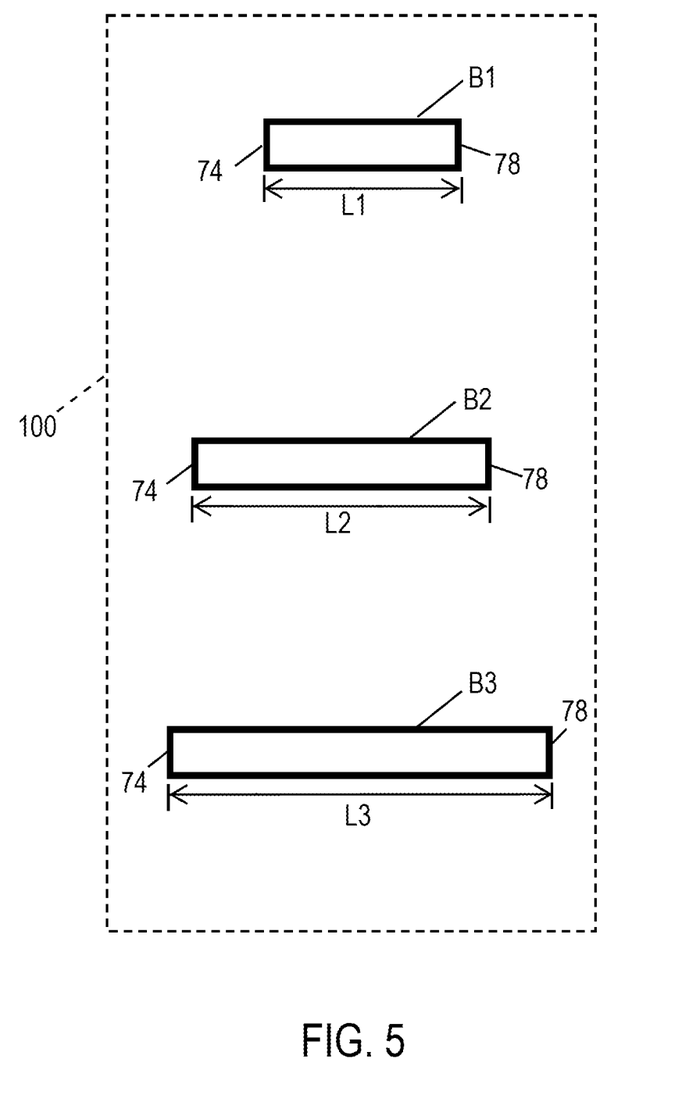
FIG. 5 is a schematic diagram illustrating images being analyzed in the control system of FIG. 4.

The sensor 70 is configured to generate a signal associated with the length L of the crop billet B. For example, the chopper 27 cuts the stalks into crop billet B each having a first end portion 74 and a second end portion 78 (FIG. 5). The length L may be defined as the distance between the first end portion 74 of the billet B and the second end portion 78 of the billet B. The sensor 70 may be configured to generate a signal associated with at least the length L of the billet B and/or other dimensions and appearance of the billet B (e.g. the appearance of the first end portion 74 and the second end portion 78).

Figure 4:
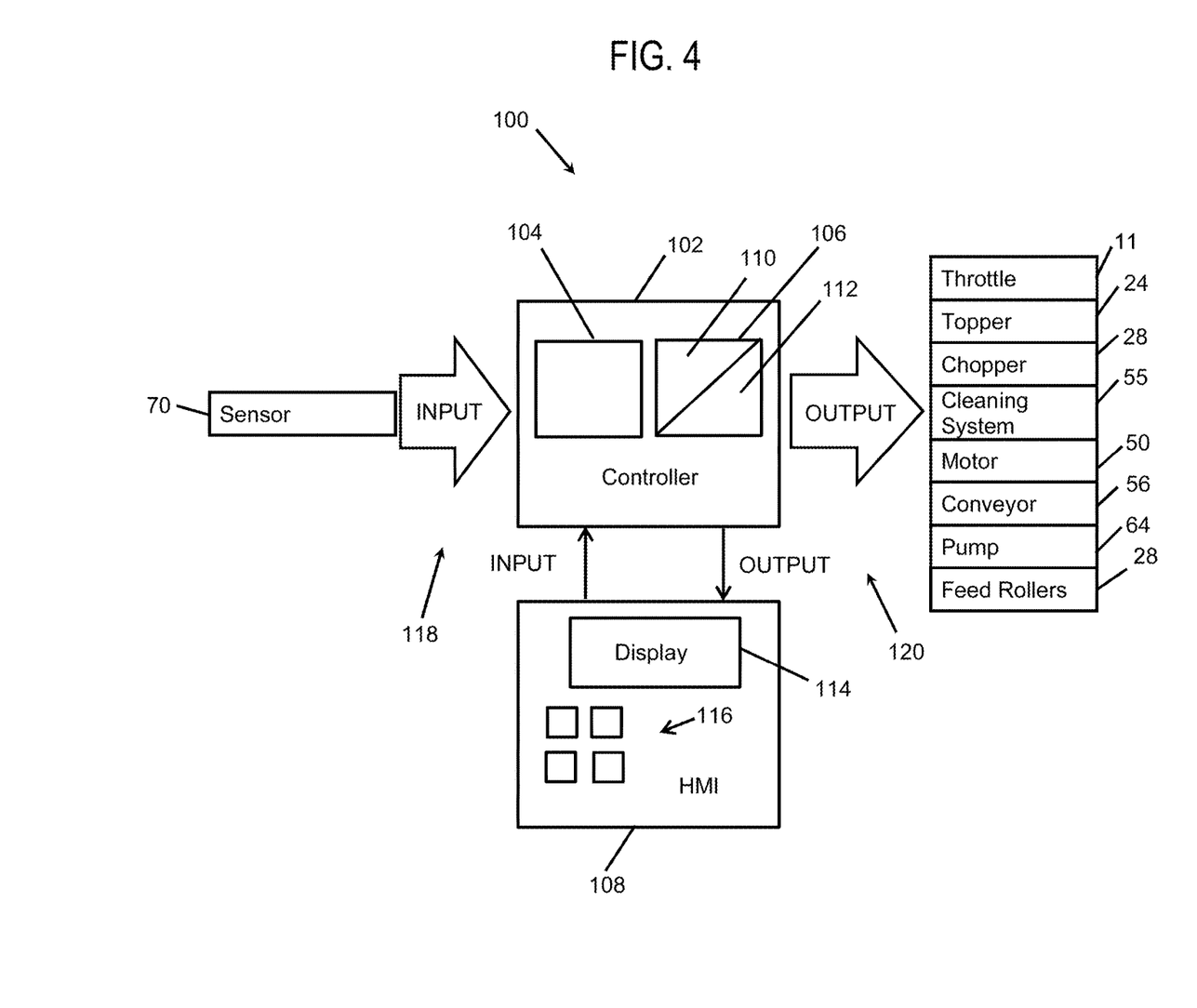
FIG. 4 is a schematic diagram illustrating a control system of the harvester of FIG. 1.

As illustrated in FIGS. 3-5, and particularly FIG. 4, a control system 100 includes a controller 102 having a programmable processor 104 (e.g., a microprocessor, a microcontroller, or another suitable programmable device), a memory 106, and a human-machine interface 108. The memory 106 may include, for example, a program storage area 110 and a data storage area 112. The program storage area 110 and the data storage area 112 can include one type or combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The control system 100 may include programming, such as algorithms and/or neural networks. The control system 100 may also, or alternatively, include integrated circuits and/or analog devices, e.g., transistors, comparators, operational amplifiers, etc., to execute the logic, algorithms, and control signals described herein.

The human-machine interface 108 may include a display panel 114 and a control panel 116. The display panel 114 may convey visual and/or audio information to an operator, e.g., a message to the operator. For example, the display panel 114 may include a screen, a touch screen, one or more speakers, etc. The control panel 116 is configured to receive input from the operator. For example, the control panel 116 may include buttons, dials, a touch screen (which may be the same touch screen that provides the display panel or a different touch screen), a personal computer, a mobile device, or the like, with which an operator can input settings, preferences, commands, etc. to control the harvester 10.

The control system 100 includes a plurality of inputs 118 and outputs 120 to and from various components, as illustrated in FIGS. 3 and 4. The controller 102 is configured to provide control signals to the outputs 120 and to receive signals (e.g., sensor data signals, user input signals, etc.) from the inputs 118. Signals, as used herein, may include electronic signals (e.g., by circuit or wire), wireless signals (e.g., by satellite, internet, mobile telecommunications technology, a frequency, a wavelength, Bluetooth®), or the like. The inputs 118 may include, but are not limited to, the control panel 116, or more generally the human-machine interface 108, and the sensors 70, 70', 70", and may include other components described herein as well as other components not described herein. The outputs 120 may include, but are not limited to, the throttle 11, the topper 24, the feed system 28, the chopper 27 including the chopper drums 29 and the blade 30, the motor 50, the cleaning system 55 (e.g., the crop cleaner 40, the fan 42, the motor 43, and/or the centrifugal blower wheel 46, or other components of the cleaning system 55), the conveyor 56, and the pump 64, and may include other components described herein as well as other components not described herein.

The control system 100 is configured to analyze an appearance of the billets B, which may include a dimension of the billets B such as the length L, configured to index the length L or other dimensions into the memory 106, configured to calculate a variability of the indexed lengths L, configured to compare the lengths L and/or the variability to a target set by the user, and configured to adjust the harvester 10 in response to the comparison (as will be described in greater detail below).

The length L of the crop billet B and the length variability are key characteristics of crop quality. The length L is dependent on multiple components of the harvester 10. The feed speed (e.g. the speed at which the feed rollers 28 are operated) changes the rate at which the cane C passes into the chopper 27. Generally, increasing the feed speed will increase the length L of the resulting crop billet B. With increased feed speed, more cane gets through the chopper 27 before the blade 30 cuts again, making for longer billets. Conversely, decreasing the feed speed will decrease the length L of the resulting crop billet B. The length L is also dependent on the cutting speed of the chopper 27 (e.g. rotational drum speed of the chopper drums 29, the cutting speed of the blade 30). Increasing the cutting speed decreases the length L of the billet B and decreasing the cutting speed increases the length L of the billet B. A relationship is therefore formed between the feed speed and the cutting speed in achieving a certain length L of the crop billet B. In some implementations, this relationship is expressed in the form of a ratio.

The control system 100 receives the signal from the sensor 70 indicative of the appearance and length of the crop billet B. The control system 100 may continuously or periodically analyze the appearance of the crop billet B downstream of the chopper 27, e.g., to measure dimensions of the crop billet B. It should be understood that a different billet B is analyzed each time, though the process of analyzing each new billet B may be the same. As such, only the process of analyzing a single billet B need be described herein.

Specifically, the controller 102 may be configured to measure the length L of the billet B based on the signal from the sensor 70 and calculate the length variability. This portion of the controller 102 may be referred to as the optical sensing system and may include the sensor 70. In other implementations, other suitable characteristics of the crop billet B may be analyzed.

FIG. 5 illustrates a representation of the signals received by the control system 100 from the sensor 70, the signals including images of the different billets B of different lengths (labeled as lengths L1-L3 and billets B1-B3, respectively, in FIG. 5). The lengths L are increasing in value from L1 to L3. The control system 100 may be hard-coded to calculate a length L1-L3, e.g., using observed measurements taken from the images (e.g., counting pixels, determining depth, employing a reference of known length, etc.) or any other suitable method, such as an algorithm that may be hard-coded or may employ a neural network trained with pre-classified images to recognize images having various lengths L of billets B. For example, the neural network may include a convolutional neural network. The measured length L of each billet B is saved in the memory 106.

In the illustrated representation, the billets B1-B3 are all posed (e.g., oriented in three-dimensional space) normal to the sensor 70. In use, the billets B may be posed at an angle relative to the sensor 70. As such, the control system 100 may be configured to analyze a pose (e.g., orientation) of the billet B using any suitable technique to assist in measuring the length L. For example, pose may be analyzed based on the appearance of the first end portion 74 and the second end portion 78, or using any other suitable technique. By analyzing the image, e.g., of the first end portion 74 and/or the second end portion 78, the control system 100 can extract pose information. In some implementations, the control system 100 may employ a machine learning classifier that is trained to determine the pose and/or billet length L based on learned characteristics that can be taught by supervised learning techniques, unsupervised learning techniques, other machine learning techniques, or any combination of machine learning techniques.

In a first mode of operation, a specific length L (which may be referred to herein as a target length) may be desired by the operator and inputted into the controller 102 by way of the human-machine interface 108. Achieving the target length L may be significant for the future use of the billet B (e.g. in the collection receptacle, in a processing machine, etc.) or for any other reasons. For example, a target length of 7.3 inches (185 mm) (or another length value) may be inputted as a billet target length, e.g., using the control panel 116, after the user has selected the first mode of operation. A deviation from the target length (e.g., a difference between the billet target length and the measured length based on the signal from the sensor 70) may be used to adjust one or both of the cutting speed or the feed speed. Thus, one or both of the cutting speed or the feed speed are adjusted based on the signal from the sensor 70. In the first mode of operation, the billet length L for each analyzed billet B is saved into the memory 106, for example, indexed in a table. The deviation of each analyzed billet B may also be indexed into the memory 106.

In a second mode of operation, a target level of length consistency or variability may be desired and inputted into the controller 102 by way of the human-machine interface 108. High length consistency (low variability) at the chopper 27 is important for improving cleaning at the crop cleaner 40 and for optimizing load densities of the harvester 10, as well as for other reasons. Greater length consistency means better cleaning results (e.g., fewer billets B mistakenly discharged as residue, less extraneous plant matter included with the billets B during transportation, etc.). In the second mode of operation, a target variability of the length, rather than a target length, may be inputted by the user. The term "target variability" is used herein to encompass a target variability and/or a target consistency. The target variability could be in the form of a percentage, a range of dimensions, or another appropriate measurement. The control system 100 is configured to use the lengths L of each billet B to determine a measured variability that can be calculated automatically. The measured variability may be determined using a simple calculation, such as the standard deviation or the variance, or a more complex calculation. In the second mode of operation, the length variability may be saved or indexed into the memory 106.

The control system 100 is configured to adjust one or more system parameters (e.g. the feed speed, the cutting speed, the cleaning speed, etc.). The control system 100 may adjust the one or more system parameters based on the signal from the sensor 70 corresponding to the length L of the crop billet B.

For example, in the first mode of operation, if the measured length L is less than the target length, the controller 102 may increase the feed speed and/or decrease the cutting speed. Conversely, if the measured length L is greater than the target length, the controller 102 may decrease the feed speed and/or increase the cutting speed. The adjusted parameters may influence the length L of subsequent crop billet B such that the subsequent length L may decrease or increase in order to approach the target length. In some implementations, the control system 100 may be configured to adjust the parameters by adjusting a ratio of the cutting speed to the feed speed such that the subsequent length L may decrease or increase in order to approach the target length.

In the second mode of operation, if the measured variability is not within the target variability, the controller 102 is configured to adjust the one or more system parameters (e.g. feed speed, cutting speed, the ratio of the cutting speed to the feed speed, etc.) such that the subsequent measured variability approaches the target variability.

Figure 6:
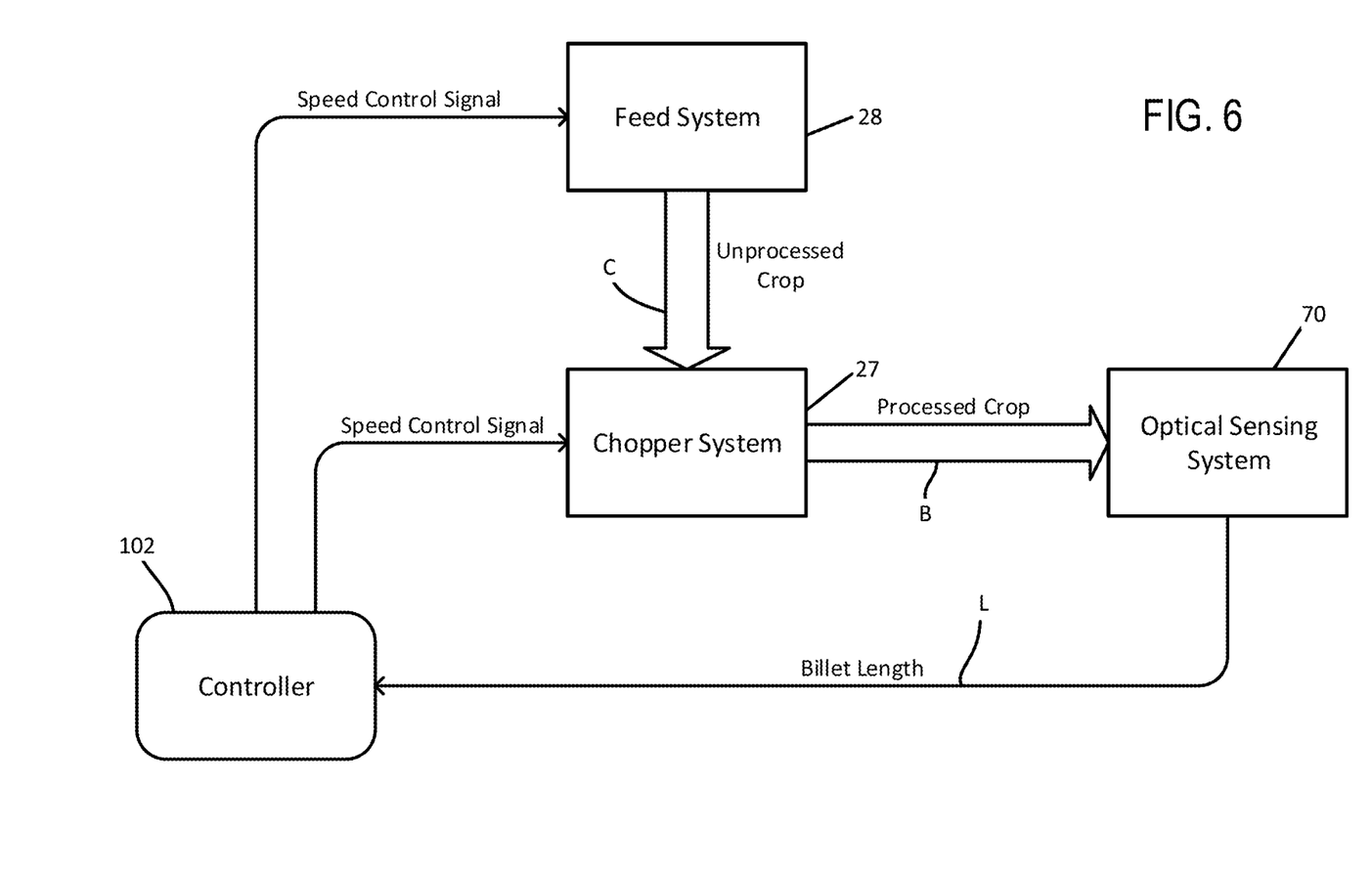
FIG. 6 is a schematic diagram of feeding and chopping control in the harvester of FIG. 1.

A schematic representation of part of the operation of the harvester 10 is shown in FIG. 6. The harvester 10 includes the feed system 28 operable at the feed speed and configured to feed the crop (e.g. cane C) towards the chopper 27 (including the blade 30) configured to cut the crop C into crop billet B, the chopper 27 operating at the cutting speed. The optical sensor 70 generates the signal corresponding to the length L of the crop billet B. The controller 102 is configured to receive the signal, determine the length L from the signal, and programmed to adjust one or both of the cutting speed or the feed speed based on the signal. The controller 102 is further configured to receive the input 118 from the operator by way of the human-machine interface 108, the input including the billet target length, and adjust one or both of the cutting speed or feed speed such that the length L of the crop billet B approaches the billet target length. The controller 102 is further configured to receive the input 118 from an operator by way of the human-machine interface 108, the input including the target variability for billet length, and adjust one or both of the cutting speed or feed speed such that the measured variability approaches the target variability.

The control system 100 may also be configured to control another system parameter (e.g. the cleaning speed) based on the length L. The control system 100 may operate in a 'Feed Back' mode as illustrated in FIG. 7 or a 'Feed Forward' mode as illustrated in FIG. 8.

Figure 7:
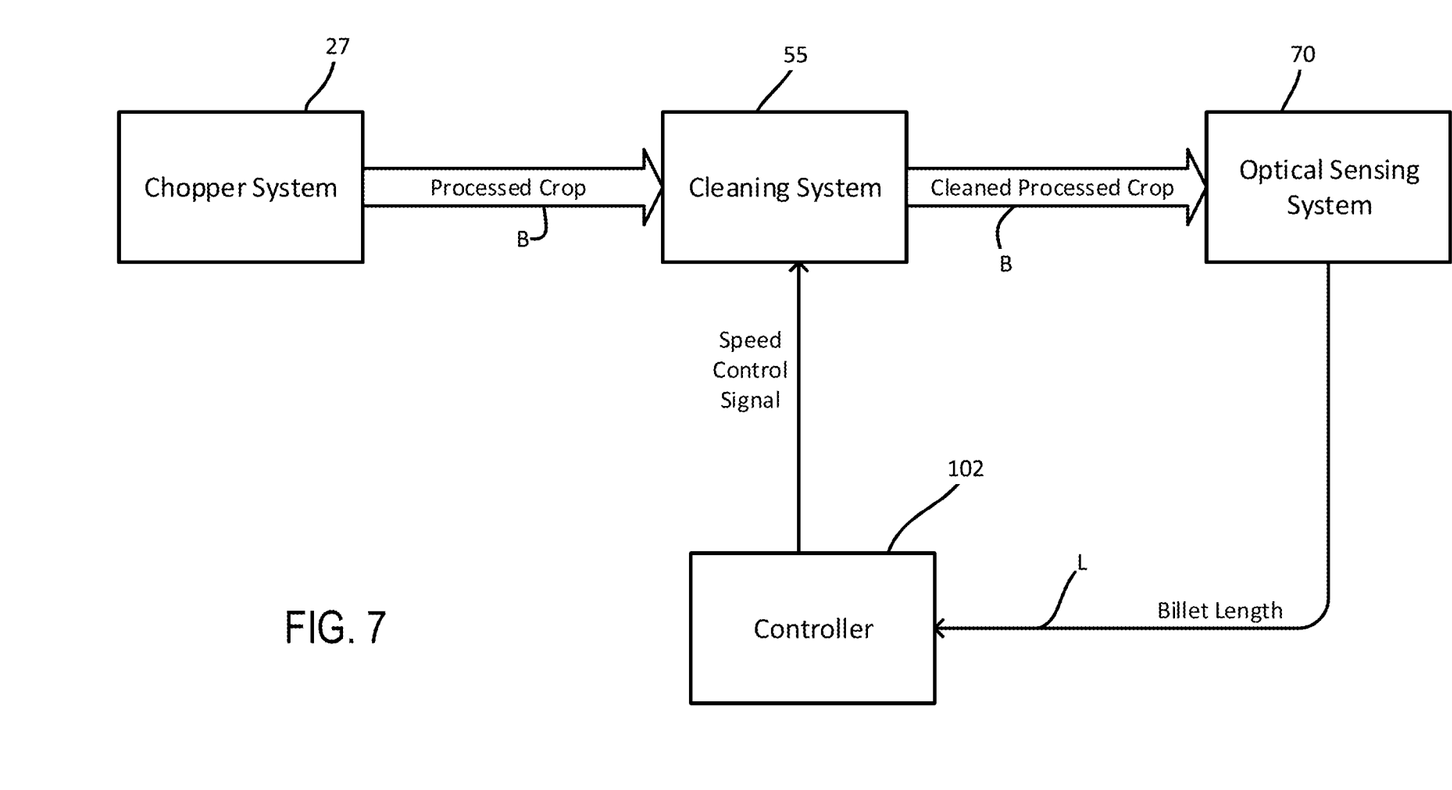
FIG. 7 is a schematic diagram illustrating a first mode of cleaning system control in the harvester of FIG. 1.

In the 'Feed Back' mode, shown in FIG. 7, the chopper 27 passes the crop billet B to the cleaning system 55. The cleaning system 55 receives a speed control signal from the controller 102. The cleaning system 55 ejects the residue and the crop billet B proceeds to the sensor 70. The sensor 70 detects the crop billet B, the signal for which is transmitted to the controller 102. The controller 102 is configured to determine the length L and the length variability from the signal(s). The controller 102 may then adjust the speed control signal to adjust the speed of the cleaning system 55 based on the length L (e.g., on the detected length L and/or the calculated length variability of the detected lengths L). For example, the controller 102 may increase the speed control signal (higher cleaning speed) for longer billets, and decrease the speed control signal (lower cleaning speed) for shorter billets. In other implementations, the controller 102 may decrease the speed control signal (lower cleaning speed) for longer billets, and increase the speed control signal (higher cleaning speed) for shorter billets. In yet other implementations, the controller 102 may decrease the speed control signal (lower cleaning speed) for increasing length variability, and increase the speed control signal (higher cleaning speed) for decreasing length variability. Other correlations between cleaning speed and the detected length L and/or the calculated length variability of the detected lengths L may be programmed into the controller 102 in other implementations. As described above, decreasing the speed may decrease billets B discharged as residue and increasing the speed may decrease the trash discharged with the billets B into the collection receptacle. In the 'Feed Back' mode, the length L is detected after the crop billet B has been cleaned.

Figure 8:
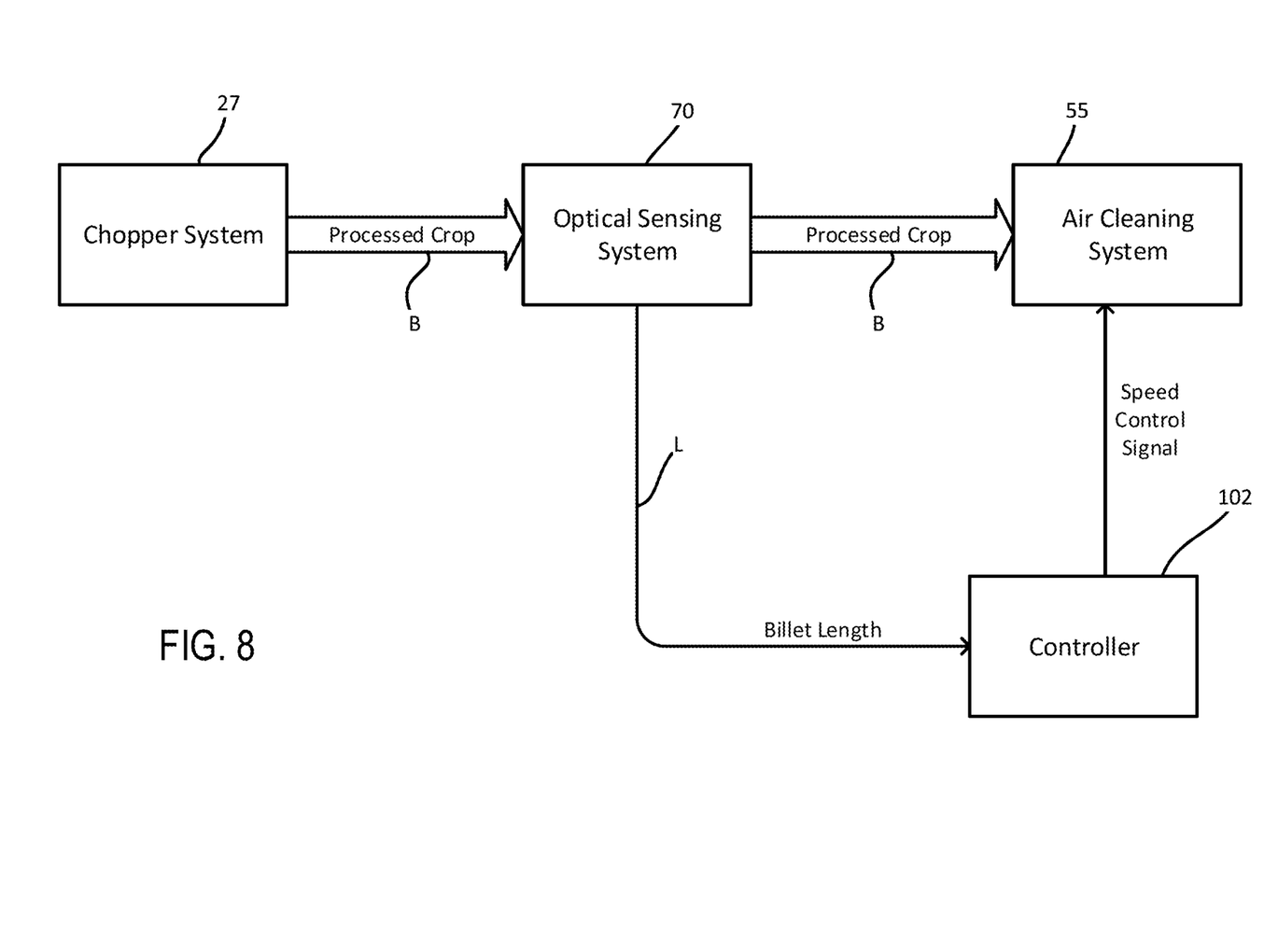
FIG. 8 is a schematic diagram illustrating a second mode of cleaning system control in the harvester of FIG. 1.

In the 'Feed Forward' mode, shown in FIG. 8, the length L is detected before the crop billet B is cleaned. The sensor 70' is configured to detect the crop billet B before the crop billet B is cleaned, e.g., is disposed between the chopper 27 and the cleaning system 55. The signal from the sensor 70' is transmitted to the controller 102. The controller 102 is configured to analyze the signal and determine the length L and the length variability from the signal(s). The controller 102 may then adjust the speed control signal used to control operation (speed) of the cleaning system 55 based on the length L (e.g., on the detected length L and/or the calculated length variability of the detected lengths L). For example, the controller 102 may increase the speed control signal (higher cleaning speed) for longer billets, and decrease the speed control signal (lower cleaning speed) for shorter billets. In other implementations, the controller 102 may decrease the speed control signal (lower cleaning speed) for longer billets, and increase the speed control signal (higher cleaning speed) for shorter billets. In yet other implementations, the controller 102 may decrease the speed control signal (lower cleaning speed) for increasing length variability, and increase the speed control signal (higher cleaning speed) for decreasing length variability. Other correlations between cleaning speed and the detected length L and/or the calculated length variability of the detected lengths L may be programmed into the controller 102 in other implementations. As described above, decreasing the speed may decrease billets B discharged as residue and increasing the speed may decrease the trash discharged with the billets B into the collection receptacle.

In operation, the user sets the billet target length and/or the target variability. The stalks of crop are conveyed from the base cutter (not shown) to the chopper 27. The chopper 27 chops the crop and delivers the stream of crop billet B and extraneous plant matter to the cleaning chamber 32 by way of the blade 30. Extraneous plant matter and crop billet B are at least partially separated by the cleaning system 55. The sensor 70 captures images of the crop billet B, and particularly of the lengths L of the billets B and sends the image signals to the control system 100. The control system 100 analyzes the images, determines the billet length L and variability, and stores the billet lengths L and variabilities in the memory 106. The control system 100 may adjust the one or more system parameters of the harvester 10 based on the indexed data. After adjusting the system parameter, the process may repeat, such that the controller 102 is continuously receiving signals from the sensor 70 and is continuously and automatically making adjustments to the system parameter as needed (e.g., creating a closed loop).

Thus, the disclosure provides, among other things, a harvester having an automatic closed loop billet length sensing and control system. Various features and advantages of the disclosure are set forth in the following claims.

What is claimed is:

1. A harvester comprising:
a feed system operable at a feed speed and configured to feed a crop towards a blade configured to cut the crop into crop billet, the blade operable at a cutting speed;
a cleaning system configured to separate at least some extraneous plant matter from the crop billet, the cleaning system having a cleaning speed;
an optical sensor configured to generate a signal corresponding to a length of the crop billet; and
a control system including a processor, a memory, and a human-machine interface, the control system configured to receive the signal and programmed to
adjust one or both of the cutting speed or the feed speed based on the signal, and
adjust the cleaning speed based on the signal.

2. The harvester of claim 1, wherein the control system is programmed to adjust one or both of the cutting speed or the feed speed by adjusting a ratio of the cutting speed to the feed speed.

3. The harvester of claim 1, wherein the control system is further configured to 1) receive an input from an operator by way of the human-machine interface, the input including a billet target length, and 2) adjust one or both of the cutting speed or the feed speed such that the length of the crop billet approaches the billet target length.

4. The harvester of claim 1, wherein the control system is further configured to 1) receive an input from an operator by way of the human-machine interface, the input including a target variability for billet length, and 2) adjust one or both of the cutting speed or the feed speed such that a measured variability approaches the target variability.

5. The harvester of claim 1, wherein the blade includes a drum cutter, wherein the cutting speed includes a rotational drum speed.

6. The harvester of claim 1, wherein the feed system includes feed rollers, and wherein the feed speed includes a feed roller speed.

7. The harvester of claim 1, wherein the optical sensor includes at least one of a three-dimensional vision camera, a LIDAR device, a structured light three-dimensional scanner, or stereo cameras.

8. The harvester of claim 1, wherein the optical sensor is configured to detect a three-dimensional image of the crop billet.

9. The harvester of claim 1, wherein the optical sensor is configured to detect a two-dimensional image of the crop billet.

10. The harvester of claim 1, wherein the control system is configured to employ a neural network to measure the length of the crop billet, wherein the neural network is trained with pre-classified images.

11. A harvester comprising:
a feed system operable at a feed speed and configured to feed a crop towards a blade configured to cut the crop into crop billet, the blade operable at a cutting speed;
a cleaning system configured to separate at least some extraneous plant matter from the crop billet, the cleaning system having a cleaning speed;
an optical sensor configured to generate a signal corresponding to a length of the crop billet; and
a control system including a processor, a memory, and a human-machine interface, the control system being configured to 1) receive an input from an operator by way of the human-machine interface, the input including a target billet parameter, 2) receive the signal from the optical sensor corresponding to the length of the crop billet, 3) adjust one or both of the cutting speed or the feed speed such that a subsequent billet parameter approaches the target billet parameter, and (4) adjust the cleaning speed based on the signal.

12. The harvester of claim 11, wherein the target billet parameter includes one or both of a desired billet length or a desired variability for billet length.

13. The harvester of claim 11, wherein the optical sensor includes at least one of a three-dimensional vision camera, a LIDAR device, a structured light three-dimensional scanner, or stereo cameras.

14. The harvester of claim 11, wherein the optical sensor is configured to detect a three-dimensional image of the crop billet.

15. The harvester of claim 11, wherein the optical sensor is configured to detect a two-dimensional image of the crop billet.

16. The harvester of claim 11, wherein the control system is configured to employ a neural network to measure the length of the crop billet.

17. A harvester comprising:
an inlet configured to receive a crop;

a blade configured to cut the crop into crop billet and extraneous plant matter;
  a cleaning system configured to separate at least some of the extraneous plant matter from the crop billet, the cleaning system having a cleaning speed;
  an optical sensor configured to generate a signal corresponding to a length of the crop billet; and
  a control system including a processor, a memory, and a human-machine interface, the control system being configured to receive the signal from the optical sensor and programmed to adjust the cleaning speed based on the signal.

18. The harvester of claim 17, wherein the optical sensor is disposed between the blade and the cleaning system to detect the crop billet before being cleaned.

19. The harvester of claim 17, wherein the optical sensor is configured to detect the crop billet after the crop billet has been cleaned by the cleaning system.

20. The harvester of claim 17, wherein the cleaning system includes at least one fan, and wherein the cleaning speed includes a speed of the fan.

\* \* \* \* \*